US011340520B2

(12) United States Patent
Sheng et al.

(10) Patent No.: US 11,340,520 B2
(45) Date of Patent: May 24, 2022

(54) APPARATUS FOR HIGH EFFICIENCY LASER STATIC PHOSPHOR MODULE

(71) Applicant: Texas Instruments Incorporated, Dallas, TX (US)

(72) Inventors: Zhongyan Sheng, Allen, TX (US); Terry Alan Bartlett, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/097,525

(22) Filed: Apr. 13, 2016

(65) Prior Publication Data
US 2017/0003580 A1    Jan. 5, 2017

Related U.S. Application Data

(60) Provisional application No. 62/187,949, filed on Jul. 2, 2015.

(51) Int. Cl.
*G03B 21/20* (2006.01)
*F21V 9/30* (2018.01)
*G03B 21/16* (2006.01)

(52) U.S. Cl.
CPC ............ *G03B 21/204* (2013.01); *F21V 9/30* (2018.02); *G03B 21/16* (2013.01); *G03B 21/208* (2013.01)

(58) Field of Classification Search
CPC ...... G03B 21/204; F21S 41/176; F21S 43/16; F21S 9/30–38
See application file for complete search history.

(56) References Cited

U.S. PATENT DOCUMENTS

| | | | |
|---|---|---|---|
| 2004/0233664 A1* | 11/2004 | Beeson | G02B 19/0019 362/231 |
| 2012/0154767 A1* | 6/2012 | Kimura | H04N 9/315 353/98 |
| 2015/0346594 A1* | 12/2015 | Shimizu | G03B 21/204 353/31 |

\* cited by examiner

*Primary Examiner* — Sean P Gramling
(74) *Attorney, Agent, or Firm* — Michelle F. Murray; Charles A. Brill; Frank D. Cimino (57) ABSTRACT

In described examples, a body includes an opening in a central portion of a surface, a cavity having sides extending from the opening into the body, and a bottom surface within the body supporting a phosphor configured to emit light when energized by incoming light. In a further arrangement, the sides are tapered from the opening to the bottom surface, such that a cross sectional area of the opening is greater than a cross sectional area of the bottom surface.

16 Claims, 6 Drawing Sheets

APPARATUS FOR HIGH EFFICIENCY LASER STATIC PHOSPHOR MODULE

RELATED APPLICATIONS

This application claims the benefit of priority under 35 U.S.C. § 119(e) to U.S. Provisional Application Ser. No. 62/187,949 filed Jul. 2, 2015, entitled "HIGH EFFICIENCY LASER STATIC PHOSPHOR MODULE," which application is hereby incorporated by reference herein in its entirety.

TECHNICAL FIELD

This application relates generally to optical devices for image projection.

BACKGROUND

Applications of optical projection devices currently include small and medium size projectors ranging from mobile and portable compact projectors through transportable and large scale fixed projectors. Also, increasingly compact optical projection devices are being provided (or are planned to be provided) as embedded compact optical projectors in consumer electronic devices, such as cell phones, tablet and laptop computers, and still and video cameras. Additional applications include displays, such as ones used in wearable devices, and "heads-up" displays for cockpits and automobiles.

Small and medium size fixed and transportable projectors are commonly and increasingly used in class rooms and conference rooms for education, training, and organizational meetings and presentations. Small and medium size fixed and transportable projectors are frequently used for home entertainment to view television programming and other video content. By adding an embedded compact optical projector to portable personal devices, the user does not need to carry a separate dedicated projector. The user can use the embedded compact optical projector with many different types of surfaces as a display screen for use in such activities as watching video, displaying still photography, showing slides for presentations, personal entertainment or group entertainment. The compact embedded optical projector is particularly well suited for times when the user has only one portable device available, such as while traveling, to view video and still images without carrying a dedicated projector, DVD player, portable television or computer.

The projection of images and video using an optical projector device that is configured for compact through medium size typically uses various light sources, lenses, color filters, beam splitters, reflectors, and spatial light modulators (SLMs), such as digital micro-mirror devices (DMD), liquid crystal display (LCD) and liquid-crystal-on-silicon (LCoS) devices, and other optical parts. These projectors can be of varying sizes, but are typically less than about 30 mm thick. The optical projection systems are formed in two parts, which are: an illumination system for generating and collecting the light rays needed to illuminate an image; and a projection system for collecting the illuminated image light rays into a projection lens or group of lenses and then projecting the image out of the optical projector device focused on a viewing surface such as a screen.

Conventional projectors employ various approaches in the illumination systems to generate sufficient light intensity, so the projected image meets the brightness requirements of the intended application of the projector. The intended application of a projector typically imposes additional requirements and limitations on the illumination system, such as physical size, heat generation, noise generation, cost, maintenance requirements, and system life time.

The illumination systems of conventional projectors are built with various types of light sources including incandescent and arc lamps, light emitting diodes (LEDs), lasers, and laser excited phosphor. Illumination systems additionally are typically made to produce separate colors, either spatially or temporally. Illumination systems employ optical parts, such as lenses, mirrors, wavelength selective filters, wavelength selective mirrors, prisms, and beam splitters that route the light from the light source or sources to the spatial light modulator. These optical parts are typically arranged for the light impinging on the spatial light modulator to be approximately uniform in intensity over the entire surface area of the spatial light modulator and to subtend a range of angles relative to the plane of the spatial light modulator, such that the projection optics collect and focus a large portion of the light on a viewing surface external to the projector.

Projector illumination systems have been improved in multiple technical areas in recent years. Two key areas of improvement have been the reduction of and in some cases elimination of moving parts, such as rotating color wheels and rotating phosphor wheels and improved solid state light sources (LED, laser, and laser excited phosphor), so incandescent/arc lamp light sources are not necessary to meet brightness requirements of many projector systems.

Figure 1:
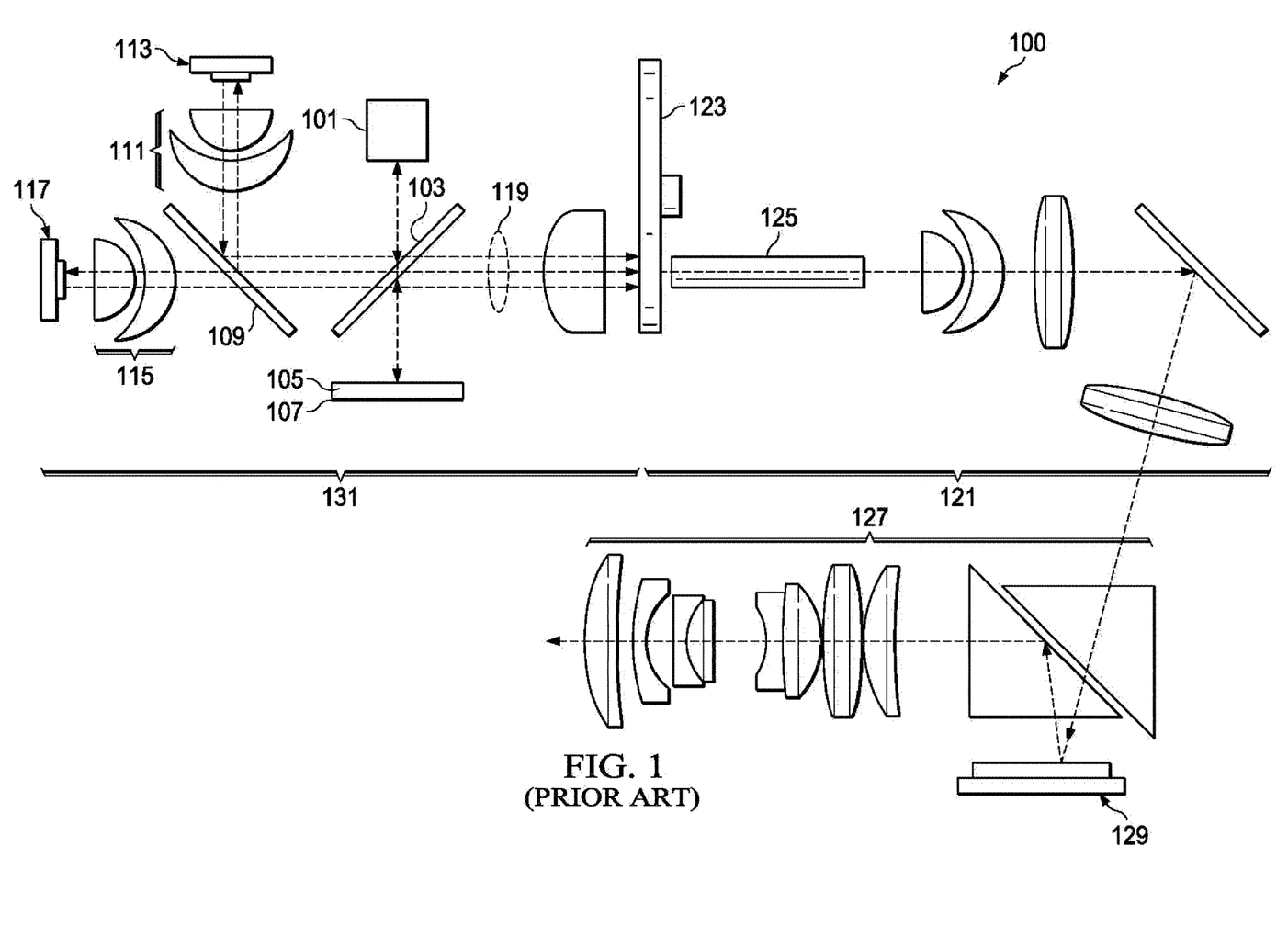
FIG. 1 depicts light sources and optical parts of an example projector device employing conventional phosphor modules.

FIG. 1 shows the light sources and optical parts of an example projector device 100 that employs conventional phosphor modules. Projector device 100 includes the illumination system (131 combined with 121), the spatial light modulator 129, and the projection system 127. The conventional projector of FIG. 1 employs an illumination system employing light sources that are built with laser diodes and static (non-rotating) phosphor modules.

Block 101 of system 100 represents a group of laser diodes and optics to combine and collimate the laser light output. Laser light exiting block 101 illuminates the static phosphor modules 113 and 117 (a phosphor wheel is not used in the example of FIG. 1). For the example of FIG. 1, the laser light produced by 101 is blue, light produced by phosphor module 113 is red when excited by the laser light, and the light produced by phosphor module 117 is green when excited by the laser light. This blue, red and green light is combined resulting in white light exiting 131 to the remaining optical components 121 of the illumination system. The dashed lines 119 represent the approximate center of the blue, red and green light ray bundles that are approximately coincident but drawn slightly offset for clarity.

Various types of optical parts can be employed in various arrangements to direct laser light from 101 to the phosphor modules 113 and 117 and combine light produced by the lasers and phosphor modules into white light. FIG. 1 depicts an example arrangement of dichroic mirrors and polarizing beam splitters (103 and 109), a ¼ wave plate and mirror (105 and 107 respectively), and lens groups 111 and 115 that both focus laser light on the phosphor modules (113 and 117) and collimate the light produced by the phosphor modules. In various configurations, the dichroic mirrors can be designed to operate as polarization beamsplitters at certain wavelengths. In FIG. 1, the polarizing beam splitter is arranged to operate as a beamsplitter for blue light, but it passes red and green wavelength light. The dichroic mirror 109 in FIG. 1 operates as a 50% beamsplitter for blue, so that both the red and green phosphors are illuminated.

In the example of FIG. 1, the portion of the illumination system following 131 in the light path is labeled 121 and contains a color wheel 123, an integrator rod 125, and optical parts for collimation, condensing, relay and folding of the light path.

As illustrated in FIG. 1, light exiting 121 enters the projection system 127. The example projection system 127 of FIG. 1 employs a digital micro-mirror device (DMD) spatial light modulator (SLM) device 129. The system includes prisms that direct the illumination light from 121 to the DMD 129 surface and direct the modulated light from the DMD surface to a group of lenses that magnify and focus an image of the DMD surface on an external viewing surface such as a screen.

Figure 2:
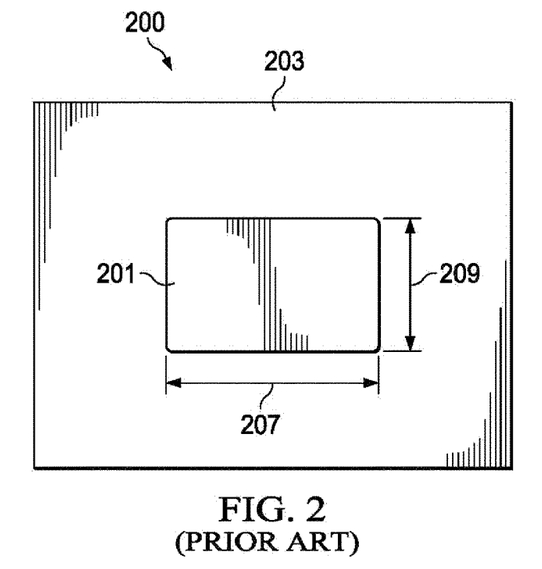
FIG. 2 depicts the front view of an example conventional static phosphor module.
Figure 3:
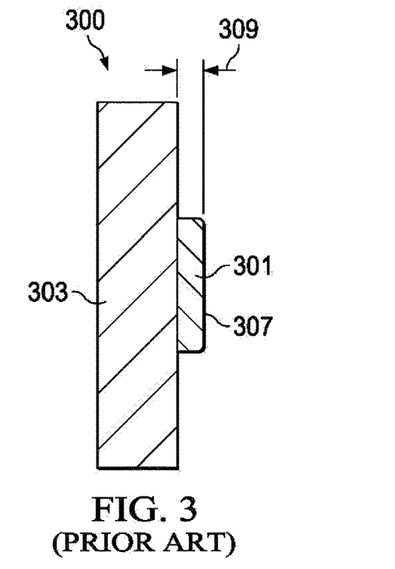
FIG. 3 depicts a sectional side view of an example conventional static phosphor module.

The conventional static phosphor modules 113 and 117 of FIG. 1 are further depicted in FIGS. 2 and 3. FIG. 2 illustrates a front view of an example conventional phosphor module 200. As used herein, the front view of a phosphor module depicts the exposed surface 201 of the phosphor material.

FIG. 3 illustrates a sectional side view of the example conventional phosphor module 300 (also illustrated in FIG. 2 as 200). The phosphor material 301 is mounted on a plate 303 (203 of FIG. 2). The plate 301 is typically made of a material (such as a metal or ceramic) that provides stable mechanical support for the phosphor material and heat dissipative properties. In the example of FIG. 3, the exposed surface of the phosphor 307 forms an approximate rectangle of height 209 and width 207 as illustrated in FIG. 2.

All sectional side views of parts included herein, such as FIG. 3, are unconventional, because they illustrate only the front surface of the section. For clarity, beyond the front surface of the section, mechanical aspects of the illustrated part are not illustrated.

External laser light (employed to excite the phosphor material) impinges the exposed surface 307 of the phosphor of FIG. 3. The light produced by the phosphor exits the exposed surface 307 of the phosphor. Light produced by the phosphor (and exiting the conventional phosphor modules) subtends a wide angle.

For clarity, a top sectional view of the example conventional phosphor module is not shown. The side sectional view (FIG. 3) is similar to the top sectional view, except that the top sectional view would illustrate the width (207 in FIG. 2) of the phosphor material, whereas the side sectional view (FIG. 3) illustrates the height 209 in FIG. 2.

Light sources employing lasers and static phosphor modules are not limited to projectors similar to the arrangement or application of the example in FIG. 1. For example, industrial and scientific applications are possible, including ones that need monochrome or limited light wave length ranges. Also, the spatial light modulation technology is not limited to DMDs, and multiple DMDs can be employed in a single projector device. Alternatives to DMD technology include liquid crystal display (LCD) and liquid-crystal-on-silicon (LCoS). When alternatives to DMDs or multiple DMDs are employed, the arrangement of optical parts within the illumination and projection systems typically differ significantly when compared to the example of FIG. 1.

For illumination systems, conventional laser excited static phosphor light sources can result in improvements for projector devices in some applications, when compared to alternative light sources (such as incandescent/arc lamps, LEDs, and rotating phosphor wheels). When compared to LEDs, conventional illumination systems have achieved increased brightness (lumen output). When compared to incandescent/arc light sources, static phosphor light sources have achieved improved reductions in: heat generation, system maintenance, noise generation by fans and rotating color wheels, size, weight and cost. System life can be increased by elimination of rotating color and phosphor wheels.

Although conventional laser excited static phosphor light sources have achieved several improvements as described above, those improvements may require a number compromises that impact system cost and performance as described below.

For projector devices, conventional laser excited static phosphor light sources typically employ laser light focused to a spot on the exposed surface of the phosphor material or pass the laser light through a diffuser in the light path before the phosphor material. By focusing laser light to a spot on the phosphor material, it typically results in additional cost due to higher precision optical components being required and potentially additional manufacturing time and cost to optically align components and adjust focus. Also, the focused laser spot is typically not uniform in light intensity. When a diffuser is employed to create a more uniform light distribution on the phosphor surface, the laser light covers a larger area on the phosphor material and is more uniform in intensity resulting in more spatially uniform light emission from the phosphor. Diffusion of the laser light typically results in the phosphor emitting light from a large circular area, so a greater etendue mismatch results with the SLM than with a focused laser spot.

When the laser is focused to a spot on the phosphor surface, thermal quenching of the phosphor material is a possibility that typically limits the performance of the illumination system. To prevent thermal quenching either the laser light flux per unit area of phosphor material must be reduced or more rapid heat removal is required. For a projection system employing a rotating phosphor wheel, heat energy per unit area of phosphor is reduced, resulting in reduced thermal quenching.

With conventional rotating and static laser/phosphor systems that employ phosphor modules, the light emitted by the phosphor material subtends a wide angle. To collect a large portion of the light emitted by the phosphor, a fast (short focal length) lens mounted close to the phosphor module is often employed. In the example of FIG. 1, the distance between the phosphor modules 113 and 117 and the adjacent lens surfaces of lens groups 111 and 115 respectively are small. As described hereinabove, a lens group employed to collect the light emitted by a phosphor module is also used to focus laser light on the phosphor. Because a lens group is placed a short distance from a phosphor module as described above, the lens group is also a short distance from the focal point of the laser light, resulting in high localized laser light flux within the lens closest to the phosphor module. Due to heat transfer from the phosphor material to the lens and high localized laser light flux within the lens, a portion of the lens may reach a temperature that results in damage to the lens, changes to its optical properties, or both.

In cases where a lens is placed close to a phosphor module as described above, the mechanical tolerance for the positioning of the lens relative to the phosphor is typically small, potentially resulting higher manufacturing cost and higher cost lens mounting parts. Also, for examples of conventional approaches where the laser light is focused to a spot on the surface of the phosphor through the same fast lens as described above, the focus may require adjustment during manufacturing, which potentially increases cost.

Due to the need for a short focal length lens, another factor is that short focal length lenses are typically more costly than longer focal length lenses.

Some conventional laser excited static phosphor light sources are made with a phosphor surface area larger than necessary for etendue match with other projector components. In such a case, the area of the phosphor that emits light is larger than the area covered by the laser light impinging the surface of the phosphor material, due to the "phosphor emitting area growth" phenomenon. Phosphor emitting area growth is caused by laser light being scattered as it penetrates the phosphor material and by scattering of light emitted by additional phosphor material below the exposed surface of the phosphor material. The light emitted by the phosphor resulting from phosphor emitting area growth is typically wasted light energy and potentially results in additional system cost for conventional approaches that employ additional parts or more complex parts to block the wasted light.

SUMMARY

In described examples, a body includes an opening in a central portion of a surface, a cavity having sides extending from the opening into the body, and a bottom surface within the body supporting a phosphor configured to emit light when energized by incoming light.

DETAILED DESCRIPTION

Corresponding numerals and symbols in the different figures generally refer to corresponding parts unless otherwise indicated. The figures are not necessarily drawn to scale.

When the term "coupled" is used herein to describe relationships between elements, it is not limited to "connected" or "directly connected." Accordingly, the term "coupled" may further include connections made through intervening elements, so additional connections may exist between any elements that are "coupled."

In comparison to at least some conventional techniques, example embodiments reduce cost and increase performance, such as by using fewer optical and mechanical components, reducing manufacturing complexity, reducing cooling requirements, increasing brightness of the projected image, increasing illumination efficiency, and increasing illumination uniformity.

Figures 4, 5:
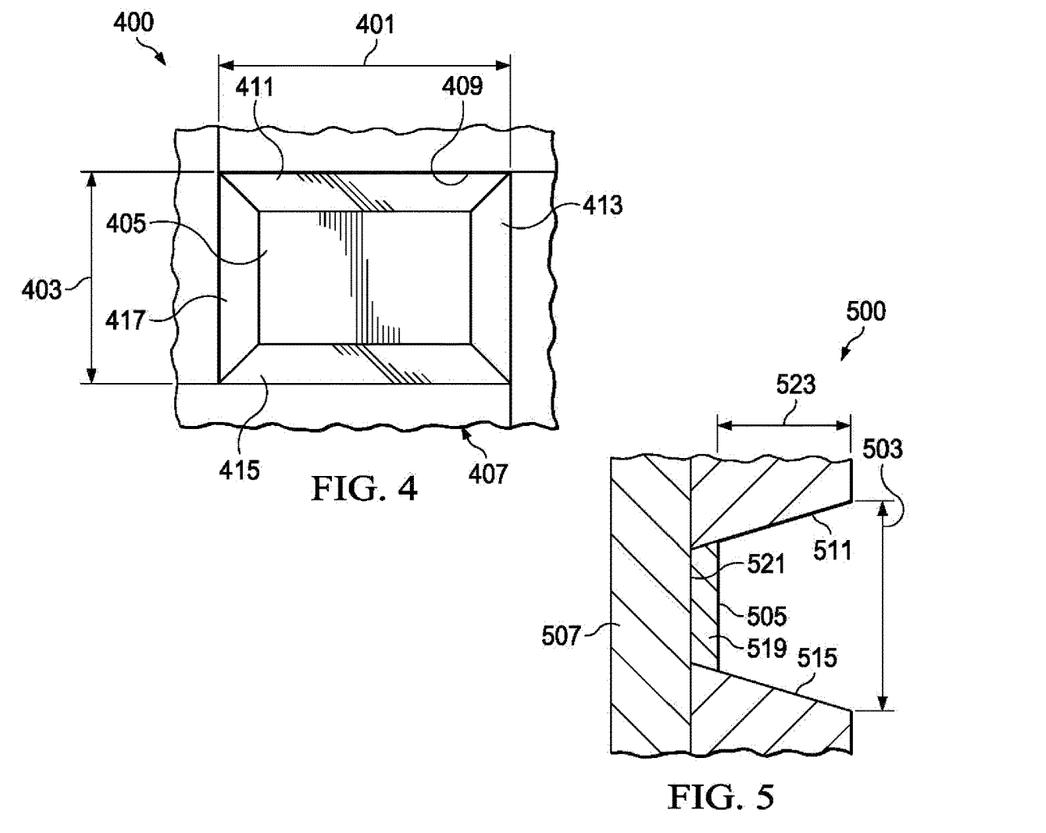
FIG. 4 depicts the front view of an example phosphor module arrangement that forms an aspect of example embodiments.
FIG. 5 depicts a sectional side view of an example phosphor module that forms an aspect of example embodiments.

This description includes various arrangements of static phosphor modules for optical projector devices. In optical projector devices, such arrangements result in simplified illumination systems and improved performance. FIGS. 4 and 5 show arrangements of materials that form an example. The word "static" as it relates to a phosphor module indicates that phosphor material is not mounted on a rotating phosphor wheel.

Described examples provide phosphor illumination sources without the need for mechanical phosphor wheels, and which provide high brightness, conserve etendue, provide light that is well matched to spatial light modulators, and have excellent thermal performance with simple and cost effective static phosphor modules. In the arrangements, phosphor material (which emits light when impacted by illumination light) is disposed within a cavity formed in a thermally conductive body. The module can be formed of a single piece of conductive material, such as metal, or can be formed from pieces of the material arranged to form a cavity when positioned together. Multiple ones of the modules can be arranged to form illumination sources for a projection system. Laser or LED sources can provide the incoming light for the phosphor material.

For ease of explanation, this description refers to optical projectors that employ a single spatial light modulator element. However, aspects of example embodiments can be employed in optical projectors that are built with multiple spatial light modulators.

FIG. 4 depicts a front view of a phosphor module 400 of example embodiments. The front view of the module illustrates the width 401 and height 403 of the single rectangular opening 409 of the module. The module opening externally exposes the rectangular surface 405 of the phosphor material. In this non-limiting example, both the module opening 409 and the exposed phosphor surface are rectangular with approximately the same aspect ratio (the ratio of width to height). The exposed phosphor surface 405 is illuminated as described below through opening 409 by a light source (not shown in FIG. 4) external to the module 400. Also, the light produced by phosphor material (when excited by the external light source due to phosphorescence) emits from the phosphor material through the surface 405 and exits the module through opening 409. All surfaces of the phosphor material excluding the exposed surface 405 are in contact with the module body 407 or an intermediate material between the module body and phosphor.

The width and height of the exposed phosphor surface 405 are less than the respective width 401 and height 403 of the module opening. Consequently, the interior sides (411, 413, 415 and 417) of the module form a tapered shape. The tapered shape is larger at the opening 409 of the module and smaller at the exposed surface 405 of the phosphor material.

FIG. 5 depicts a sectional side view of the module 400 of FIG. 4 (labeled 500 in FIG. 5). FIG. 5 shows the externally exposed surface 505 of the phosphor material 519 and the module body 507. The height dimension 503 of the rectangular module opening (409 of FIG. 4) is illustrated in the side view of FIG. 5. The interior surfaces 511 and 515 of the module 500 are sectional side views of the surfaces 411 and 415 of FIG. 4 respectively. The rear interior surface 521 of the interior of the module body is illustrated in contact with the rear surface of the phosphor material 519.

For clarity, a top sectional view of the module is not shown. The side sectional view (FIG. 5) is similar to the top sectional view, except that the top sectional view would illustrate the length of the long sides of the rectangles 405 and 409, whereas the side sectional view illustrates the length of the short sides of rectangles 405 and 409.

In various arrangements, the module body (407 and 507 of FIGS. 4 and 5 respectively) can be made from various materials, including metal for the module body to mechanically support the phosphor material and to provide sufficient heat dissipative properties, such that (in conjunction with thermal management system of the optical projector device in which the module is employed) the phosphor material is maintained below the temperature that would otherwise cause failure or reduce performance of the phosphor material. The module body can be made from a single piece of material, such as stamped, machined or cast metal. Also, the module body can be made from multiple parts as described below. In alternative arrangements, the module body is made from materials other than metal.

The interior surfaces (411, 413, 415 and 417 of FIG. 4 and 521 of FIG. 5) of the module are made to be highly reflective of: the incoming light that excites the phosphor; and the light that is emitted by the phosphor. For example, for a module body made of aluminum, the interior reflective surfaces of the module body could be made by polishing the body material. Alternatively, reflective coatings deposited or plated on the interior surfaces could be employed. Additionally, a part or parts made of reflective material inserted into and attached to the module body interior can be employed in further alternative arrangements.

For clarity, example arrangements described herein are based on the exposed surface of the phosphor and the module opening (405 and 409 respectively of FIG. 4), which are both approximately rectangular with the following geometric characteristics: the rectangles are in separate planes that are approximately parallel; the rectangles have aligned centers where normal rays to the respective rectangles at the respective centers of the rectangles lie approximately on the same line; and both rectangles have aligned aspects in which the long sides and the short sides of the rectangle formed by the exposed surface of the phosphor are parallel to the long sides and the short sides respectively of the rectangle formed by the module opening.

For examples of the above described geometric characteristics, the shape and dimensions of the module interior between the exposed surface of the phosphor and the module opening can be described based on the following dimensions and characteristics: height and width of the module opening 409, height and width of the exposed phosphor surface 405, and the shape (for example, approximately flat or curved as described below) of the reflective surfaces (411, 413, 415 and 417), and the depth 523 of the module interior measured between and perpendicular to both the module opening and the exposed surface of the phosphor.

FIG. 5 shows flat interior surfaces of the module; however, a potential for higher performance exists when the reflective surfaces are made with non-flat shapes to form additional arrangements (curved for example) as further described below.

Examples could be made where the exposed surface of the phosphor 405 and the module opening 409 are not rectangles for applications of projector devices where rectangular shapes for exposed surface of the phosphor and the module opening are not critical or disadvantageous. Various module shapes are possible to form additional arrangements.

Example phosphor modules can be made with a wide variety of internal and external shapes and dimensions. The internal and external shapes and dimensions for a specific example are based on the arrangement of optical parts, mechanical parts and performance requirements for a specific example projector device in which the phosphor module is employed.

Unlike conventional phosphor modules, in the arrangements of example embodiments, the interior of the phosphor module body extends a significant distance beyond the exposed surface of the phosphor (dimension 523 of FIG. 5), the interior surfaces of the module are highly reflective as described above, and the interior of the module body is tapered or otherwise shaped (as described below) to slow the angle of the light exiting the module. In phosphor modules of example embodiments, the distance from the module opening to the exposed surface of the phosphor (dimension 523 of FIG. 5) is sufficient for light exiting the phosphor surface at wide angles to be reflected by the interior reflective surfaces of the module one or more times before exiting the module.

Figure 6:
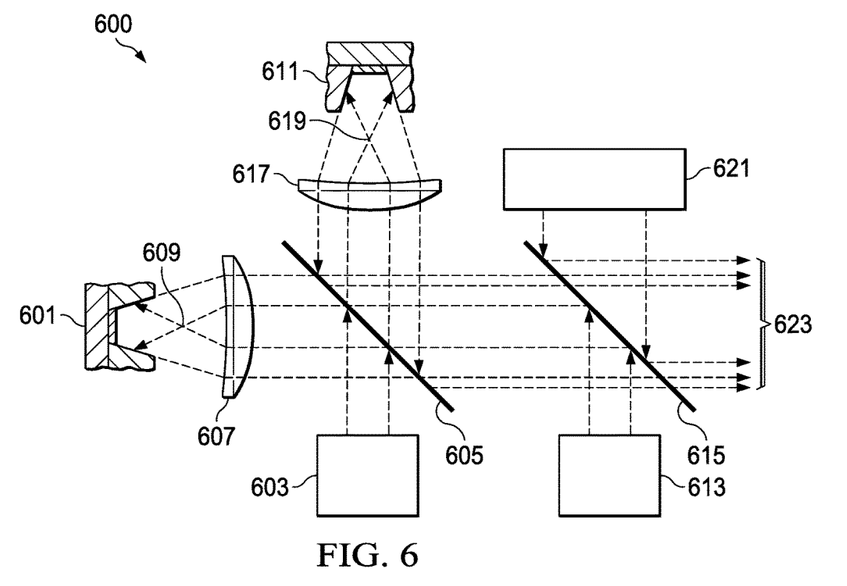
FIG. 6 depicts phosphor modules, lasers and optical parts in an example system arrangement forming the first portion of the illumination system of an example optical projector device.
Figure 7:
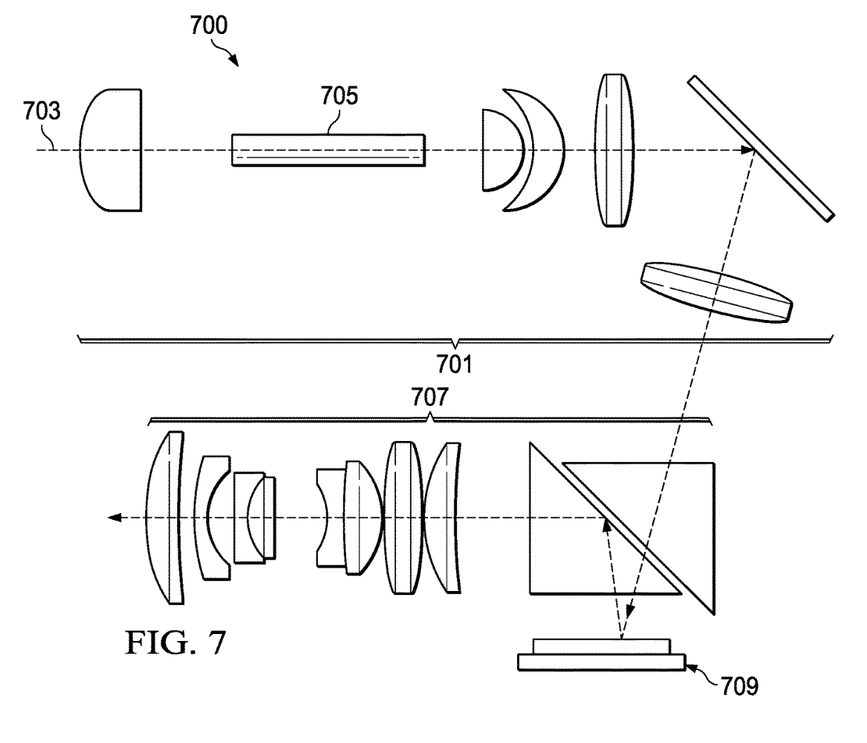
FIG. 7 depicts a portion of the illumination system and the projection system including an example optical projector device employing example arrangements.

FIGS. 6 and 7 combine to illustrate an example arrangement of lighting and optical parts of an example projector device employing example arrangement. FIG. 6 shows phosphor modules, lasers and optical parts in an example arrangement forming the first portion of the illumination system 600 (the second and final portion of the illumination system is illustrated in FIG. 7), which produces collimated light consisting of three colors (such as red, green and blue). In the system of FIG. 6, phosphor modules 601 and 611 are example arrangements. Blocks 603, 613 and 621 each represent one or more blue laser light sources and lenses that collimate the laser light. For the example of FIG. 6, phosphor module 601 produces green light when excited by collimated laser light from block 603, and phosphor module 611 produces red light when excited by collimated laser light from block 613. Collimated laser light produced by 603 is reflected by the dichroic mirror 605 and focused by lens 607 to a spot 609 in the air. Collimated laser light produced by 613 is reflected by the dichroic mirrors 615 and 605 and focused by lens 617 to a spot 619 in the air. Laser light beyond the focal points 609 and 619 impinges the exposed phosphor surfaces of modules 601 and 611 respectively. By focusing the laser light in the air, a portion of the laser light cone beyond the focal points 609 and 619 is reflected by the interior surface of the modules 601 and 611, respectively, before impinging the phosphor surfaces. The remaining portion of the laser light cone impinges the phosphor surface without first being reflected.

Green and red light (produced by the phosphor material within modules 601 and 611 respectively) is collimated by lenses 607 and 617 respectively.

Green light collimated by lens 607 passes through dichroic mirrors 605 and 615 and exits the first portion of the illumination system 600. Red light collimated by lens 617 is reflected by dichroic mirror 605, passes through dichroic mirror 615, and exits the first portion of the illumination system 600. Collimated blue laser light is produced by 621 and is reflected by dichroic mirror 615 and exits the first portion of the illumination system 600. The outer rays of the green, red and blue light ray bundles exiting the first portion of the illumination system 600 are labeled 623. The light ray bundles for all three colors occupy approximately the same space, but are drawn slightly offset in FIG. 6 for clarity.

In the example of FIG. 6, the production of each color (green, red and blue) light is independently controlled by independently controlling on and off timing of the lasers internal to blocks 603, 613 and 621, respectively, eliminating the need for a color wheel in the portion of the illumination system of FIG. 7. Example embodiments include suitable circuitry (not shown) to control the on and off timing of the lasers.

FIG. 7 illustrates a portion 700 of the example optical projector device of combined FIGS. 6 and 7. FIG. 7 shows a portion of the illumination system 701 and the projection system 707, including the SLM 709 of an optical projector device in example embodiments (illustrated in FIG. 6). Light exiting the first portion of the illumination system (600 of FIG. 6) enters the final portion of the illumination 701 of FIG. 7, and passes through an integrator rod 705 and optical parts for collimation, condensing, relay and folding of the light path. The example projection system 707 of FIG. 7 employs a digital micro-mirror device (DMD) SLM device 709 and prisms that direct the illumination light from the illumination system 701 to the DMD surface and direct the modulated light from the DMD surface to a group of lenses that magnify and focus an image of the DMD surface on an external viewing surface (such as a screen). For all three colors passing through the final portion of the illumination system 701 and the projection system, the approximate center of the light ray bundle is labeled 703 in FIG. 7. Example embodiments include suitable circuitry (not shown) to control the DMD and input image data to the DMD, and such circuitry is coupled to control the DMD and the illumination sources in a projection system.

Unlike conventional approaches, for illumination systems made with phosphor modules of example embodiments, the laser light is focused in the air (as illustrated in FIG. 6), and portions of the laser light are reflected by the interior surfaces of the module before impinging the exposed surface of the phosphor as described hereinabove. Consequently, in comparison to conventional phosphor modules, example embodiments can achieve the following improvements in performance and reductions of manufacturing complexity: homogenization of the laser light impinging the surface of the phosphor without the use of additional optical parts such as a diffuser; folding the laser light cone beyond the focal point into a rectangle coinciding with the rectangular surface phosphor material; significantly reduced phosphor thermal quenching; improved etendue matching with the SLM; reduction or elimination phosphor emitting area growth; and relaxed tolerances for the positioning the laser focal point.

Additionally, light produced by the phosphor material (exiting modules of example embodiments) subtends a significantly smaller angle than it would otherwise achieve with conventional approaches. As a result, illumination systems made with arrangements of example embodiments can be built, so the lenses that collimate the light exiting modules (such as 607 and 617 of FIG. 6) have a longer focal length and are at a greater distance from the phosphor modules than in illumination systems built with conventional phosphor modules.

Additionally, employment of conventional phosphor modules may require multiple lens elements to achieve a sufficiently short focal length as illustrated in FIG. 1. This is not required when using the arrangements herein. As a result, system cost can be reduced, and reliability can be increased, for illumination systems employing example embodiments, because: long focal length lenses are typically less expensive than short focal length lenses with otherwise similar characteristics, including the possibility of a reduced number of lens elements; a relaxed tolerance is possible for the distance between the phosphor module and a long focal length lens; and the lens will experience reduced localized heating when placed a greater distance from the phosphor module, resulting from reduced laser flux density and less conductive and radiated heat from the phosphor module.

Example arrangements can be employed in illumination systems that differ from the combined example of FIGS. 6 and 7. Alternative arrangements include: illumination systems made with one or more phosphor modules; illumination systems made with one or more phosphor modules producing light colors other than separate red and green (yellow from a single module for example); illumination systems that are not made with individually controlled light sources; illumination systems that employ excitation light sources other than lasers (LEDs for example); and production of lighting not used for image and video projection, such as room lighting and automotive lighting.

Also, example embodiments include more alternatives that have potential for further: reducing the angle subtended by the light exiting the phosphor module, simplifying manufacturing, improving heat dissipation, and reducing dust accumulation on the module interior surfaces and surface of the phosphor.

Figure 8:
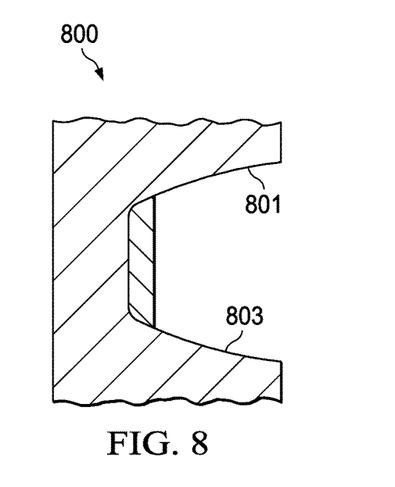
FIG. 8 depicts a sectional side view of an example module arrangement illustrating the curved shape of the interior reflective surfaces.
Figure 9:
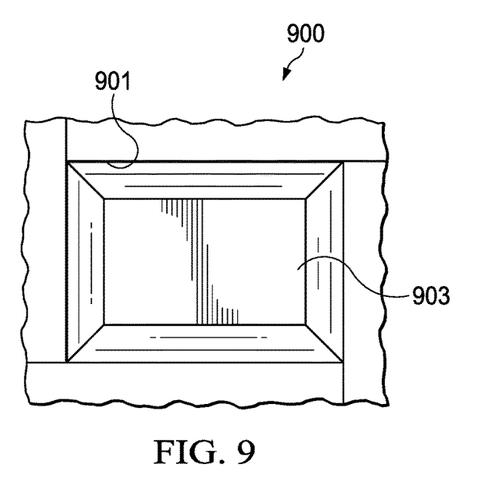
FIG. 9 depicts a front view of the example module of FIG. 8.

For example, as described above, light exiting the phosphor module (of example embodiments) subtends a smaller angle than light exiting conventional phosphor modules. The smaller angle subtended by light exiting modules (of example embodiments) is a result of the tapered shape of the module interior as described hereinabove. The interior reflective surfaces of phosphor module of example embodiments could be made with a curved shape instead of the flat surfaces illustrated in FIG. 5, such that the angle subtended by light exiting the module is less than the angle subtended by light exiting a module made with flat reflective surfaces. FIGS. 8 and 9 depict an example with reflective interior surfaces made with a parabolic shape. FIG. 8 is a sectional side view of the example module 800 illustrating the curved shape of the interior reflective surfaces 801 and 803. FIG. 9 illustrates the front view of the example module 800 of FIG. 8, which is labeled as 900 in FIG. 9. As illustrated in FIG. 9, the module opening 901 and exposed surface of the phosphor 903 both form approximate rectangles similar to the example of FIG. 4. The curved shape of the individual interior reflective surfaces of the example module is two dimensional, so the curved shape is not visible in a front view as illustrated in FIG. 9.

In addition to the parabolic shape illustrated in FIG. 8, various curved shapes, combinations of curved and flat shapes, and multiple flat segments can be employed and result in light exiting the module with smaller subtended angle than for a module made with flat interior reflective surfaces. For example, at least one example embodiment includes a circular or parabolic curve near the phosphor surface, tangentially transitioning to a flat tapered shape at a location between the phosphor surface and the module opening.

Figure 10:
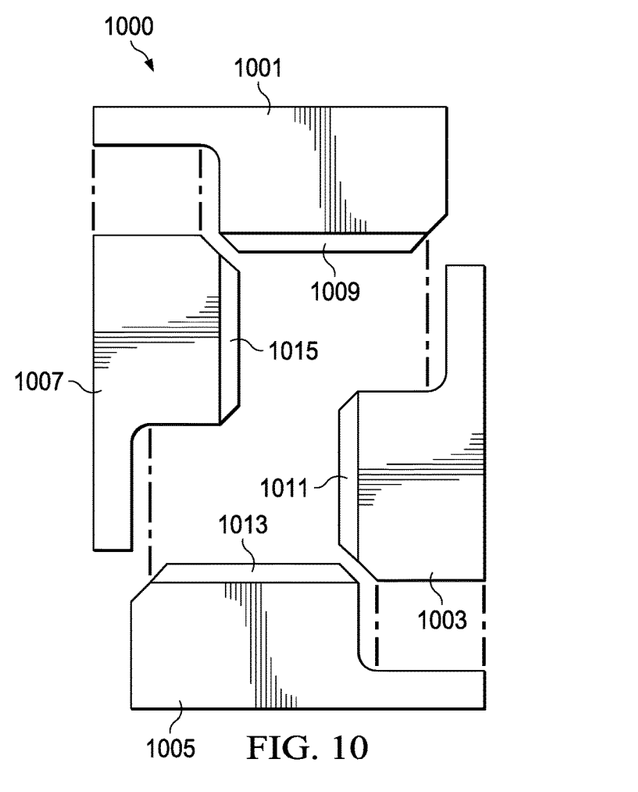
FIG. 10 depicts a group of parts that when assembled together form the sides of a phosphor module arrangement that forms an additional aspect of example embodiments.
Figure 11:
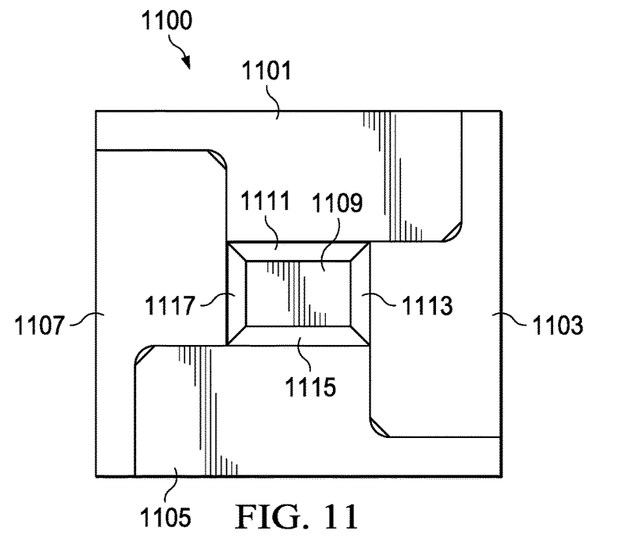
FIG. 11 depicts the front view of a phosphor module made from the parts of FIG. 10, a rear plate, and phosphor material.
Figure 12:
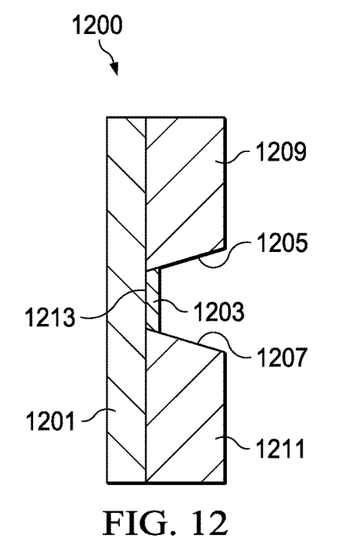
FIG. 12 depicts a sectional side view of the phosphor module of FIG. 11.

In some example arrangements, the module body is a single part. In alternative arrangements, the modules are formed of multiple parts attached together. A module body arrangement example made from multiple parts is illustrated in FIGS. 10, 11 and 12. FIG. 10 illustrates a group of parts 1000 that, when attached together as illustrated in FIG. 11, form the module body sides and the interior reflective surfaces.

FIG. 11 shows the front view of the example module 1100 made from the parts 1101, 1103, 1105 and 1107 (illustrated in FIG. 10 as parts 1001, 1003, 1005 and 1007 respectively), with phosphor material 1109 mounted on a rear plate (1201 in FIG. 12) not visible in the front view. Additionally, the interior reflective surfaces 1111, 1113, 1115 and 1117 of the module are illustrated in FIG. 11.

FIG. 12 shows a sectional side view the module 1200, which is illustrated as 1100 in FIG. 11. FIG. 12 shows the rear plate 1201 forming the enclosed rear of the module. The phosphor material 1203 is mounted at the rear of the module interior. The reflective surfaces 1111 and 1115 of FIG. 11 are illustrated in FIG. 12 as 1205 and 1207 respectively. Parts 1209 and 1211 of FIG. 12 are parts 1101 and 1105 of FIG. 11.

For clarity, a top sectional view of the assembled module is not shown. A top sectional view would be similar to the side sectional view of FIG. 12, except that the long dimensions of the rectangles forming the exposed surface of the phosphor material and the module opening would be illustrated, whereas the short sides of those rectangles are illustrated in FIG. 12.

Employing multiple parts to form the module body sides and rear potentially simplifies the process of making the module body interior and producing the reflective interior surfaces of the module, when compared to making the module body as a single part. The example parts 1001, 1003, 1005 and 1007 of FIG. 10 are made to have the reflective surfaces 1009, 1011, 1013 and 1015 respectively on an exterior unobstructed surface of each respective part. Shaping or forming a surface on the exterior of a part unobstructed by other surfaces, and making the surface reflective, is potentially less costly than making the interior of the module within a single part or small number of parts, such that two or more adjacent reflective surfaces exist on a single part.

FIG. 12 shows an example arrangement of a module body with flat reflective interior side surfaces as described above and a flat surface 1213 at the rear of the module body interior in contact with the phosphor material. Alternatively, the interior reflective surfaces of the example module body of FIG. 12 could be made with curved or other shapes that are not flat as described above. Also, the portion of the rear surface 1213 of the module body in contact with the phosphor material could be made with a curved or non-flat shape, similar to the example of FIG. 13 and described below.

Various attachment methods (including screw fasteners, spring clips and adhesive) are useful to attach the parts together in forming the module body of FIGS. 11 and 12. Also, thermal conductive material could be placed between the parts to improve heat dissipative characteristics of the assembled module.

Figure 13:
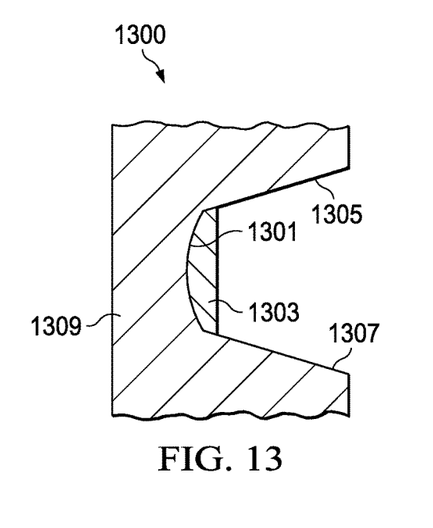
FIG. 13 depicts a phosphor module that is an example with a curved rear surface in contact with the phosphor material to improve heat dissipation.

The rate of heat removal from the phosphor material is partly dependent on the amount of surface area of the phosphor material that contacts the module body. FIG. 13 shows a sectional side view of a phosphor module 1300 that is an example arrangement. In the example of FIG. 13, the surface area of the phosphor material 1303 that is in contact with the module body 1309 is larger than in the examples of FIGS. 5, 8 and 12 for cases where the height and width of exposed surface of the phosphor is approximately the same for these four examples (illustrated in FIGS. 5, 8, 12 and 13). More phosphor surface area is contacting the module body of FIG. 13, because the rear surface 1301 of the module body interior is made with a curved shape. To achieve greater surface area contact between the module body and phosphor material, the shape of rear surface of the module interior is not limited to the curved shape illustrated in FIG. 13. Various curves and non-flat shapes can be employed.

The arrangement of FIG. 13 employs flat interior reflective surfaces 1305 and 1307, similar to surfaces 511 and 515 (FIG. 5) respectively and 1205 and 1207 (FIG. 12) respectively. However, a curved or non-flat rear surface 1301 of the module body interior can be employed in an example module, with interior reflective surfaces having curved shapes or shapes other than flat as described above.

Figure 14:
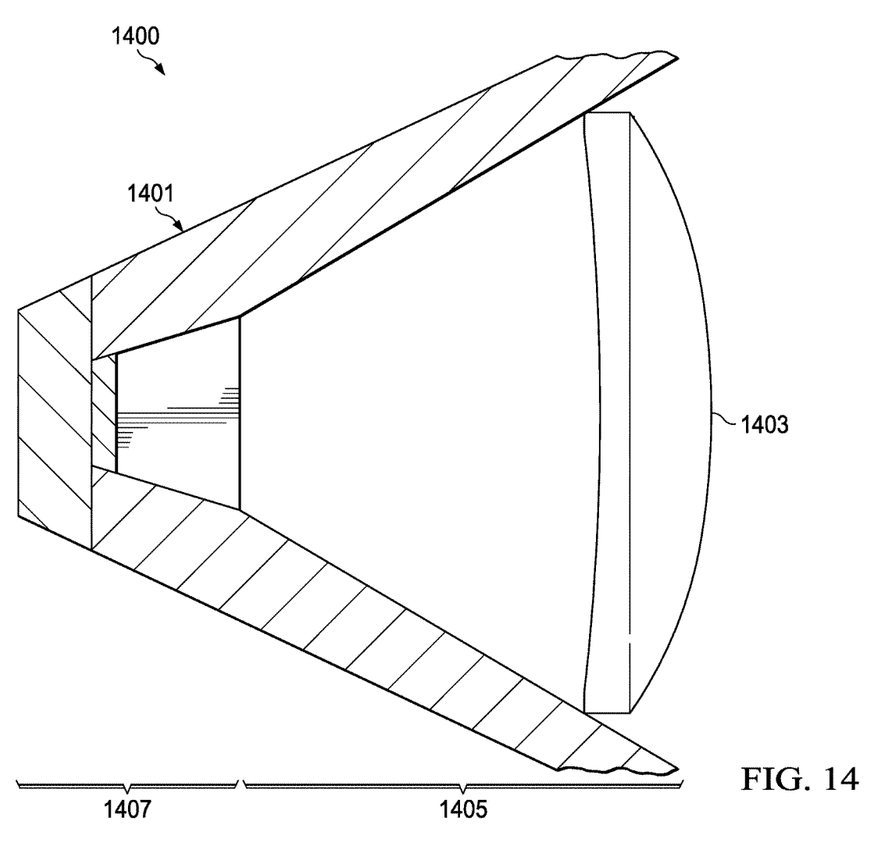
FIG. 14 depicts a phosphor module that is an example arrangement incorporating a structure to mount a lens.

Improved illumination performance can be achieved over the life of a projector device by limiting the amount of dust that collects over time on optical surfaces. An example arrangement is illustrated in a sectional side view 1400 of FIG. 14, where the module body 1401 is enlarged (as compared to the example modules of FIGS. 5, 8, 12 and 13 described above) to serve as a mount for the lens 1403 that collimates light produced by the phosphor material and focuses the laser light employed to excite the phosphor material. Examples of such lenses are illustrated in FIG. 6 as 607 and 617. In the arrangement of FIG. 14, the enlarged module body (with the lens mounted to it) forms an enclosed air space where little or no dust can enter after assembly with the lens, which results in reduced dust accumulation over the life of the optical projector device on: the phosphor material, the internal reflective surfaces of the module interior, and the surface of the lens interior to the enclosed air space. FIG. 14 shows the portion of the module body 1407 with reflective interior surfaces and containing the phosphor material, with flat interior reflective surfaces and with a flat rear surface in contact with the phosphor material similar to FIG. 5. Alternatively, as with examples described above, the portion of the module body 1407 can be made with interior surfaces that are curved and with non-flat shapes to further slow the angle of light and to increase contact with the phosphor to improve heat dissipation.

In another alternative arrangement, the example module body of FIG. 14 could be made from multiple parts, potentially simplifying the manufacturing process. For example, the internally reflective portion of the module body 1407 could be made similar to the example of FIGS. 10, 11 and 13; and the lens mounting portion 1405 could be made from one or multiple parts attached to the internally reflective portion of the module body 1407.

The manufacturing process can potentially be further simplified by reducing or eliminating the process of aligning the lens with the phosphor module when a combined phosphor module and lens mount is employed, similar to the example of FIG. 14.

By employing the additional material to make the lens mounting portion 1405 of the example module body (FIG. 14), the rate of heat removal from the phosphor material is potentially increased by a significant amount, compared to other example module bodies described herein.

All of the example embodiments can be made with external structures to aid in heat removal, such as fins to increase contact with air. Such structures could be parts attached to the module body or made integral to single or multiple parts from which the module body is made.

Accordingly, in some example embodiments, sides of the apparatus are tapered from the opening to the bottom surface, such that a cross sectional area of the opening is greater than a cross sectional area of the bottom surface. In at least one example embodiment, the body includes a thermally conductive material. In a further arrangement, the body includes a metal. In another arrangement, the metal further includes aluminum. In yet another arrangement, the phosphor is configured to emit light that is selected from the group consisting essentially of visibly green light and visibly red light.

In at least one example embodiment, the body is configured for light (emitted from the phosphor) to impinge the surfaces of the sides of the cavity. In another arrangement, the sides are coated with a reflective material. In yet another arrangement, a cross section taken through the body (including the sides of the cavity) forms a rectangular shape.

In at least one example embodiment, a cross section taken through the body (including the sides of the cavity) forms a circular shape. In another arrangement, the phosphor has a curved bottom surface that is in thermal contact with a curved surface of the body. In yet another arrangement, the phosphor is yellow in color.

In at least one example embodiment, the body is a solid mass. In another arrangement, the body is formed from multiple pieces that are placed in contact with one another. In yet another arrangement, the apparatus further includes a closed receptacle for mounting the body at one end of a conical shaped opening, and having a lens covering an opposing end of the conical shaped opening, configured for receiving an illuminating light through the lens and onto the phosphor within the body, and for projecting light emitted from the phosphor through the lens.

In at least one example embodiment, the apparatus for projecting light includes: multiple illumination sources positioned to emit illumination light rays; a spatial light modulator having a surface for receiving the illumination light rays from the illumination sources, configured for modulating the illumination light rays with image data to form image light rays; and light projection optics positioned to receive image light rays from the spatial light modulator and to project the image light rays from at least one projection lens. At least one of the illumination sources further includes a body that includes: an opening in a central portion of one surface; a cavity extending from the opening into the body; and a bottom surface at the bottom of the cavity supporting a phosphor configured to emit light when energized by incoming light. The opening has sides that are tapered from the opening to the bottom surface of the cavity, such that a cross sectional area of the opening is greater than a cross sectional area of the bottom surface.

In at least one example embodiment, the body includes a thermally conductive metal material. In another arrangement, the thermally conductive metal is aluminum.

In at least one example embodiment, a static phosphor module for emitting light for a projection system includes: multiple pieces each including a tapered surface corresponding to one portion of a cavity, each piece fitted together with remaining ones of the pieces to form a static phosphor module having a cavity with an opening that has a cross sectional area, and having a bottom surface at the bottom of the cavity with a cross sectional area that is less than the cross sectional area of the opening; and a phosphor disposed on a bottom surface of the cavity.

In at least one example of the static phosphor module described above, the module includes a closed receptacle having a conical interior and configured to receive the pieces at one end to support the phosphor, and having a lens covering the conical opening at an opposing end. The closed receptacle is configured to receive incoming light onto the phosphor and to output light emitted by the phosphor through the lens.

In comparison to conventional techniques, example embodiments enable digital projection systems with static illumination modules having higher brightness, greater etendue conservation, lower manufacturing cost, simpler implementation, and more efficient operation with excellent thermal characteristics.

Modifications are possible in the described embodiments, and other embodiments are possible, within the scope of the claims.

What is claimed is:

1. Apparatus, comprising:
   a body having a cavity and an opening to the cavity, the cavity having a rear surface and cavity sides extending from the rear surface to the opening;
   a phosphor on the rear surface, the phosphor having tapered phosphor side surfaces contacting the cavity sides; and
   a collimating lens having a concave surface facing the phosphor, the collimating lens optically coupled to the phosphor, the collimating lens configured to direct first light to the phosphor; and
   wherein the phosphor is configured to produce second light through the opening responsive to receiving the first light.

2. The apparatus of claim 1, wherein the cavity sides are tapered from the rear surface to the opening, a cross-sectional area of the opening greater than a cross-sectional area of the rear surface.

3. The apparatus of claim 1, wherein the body comprises a thermally conductive material.

4. The apparatus of claim 1, wherein the body comprises metal.

5. The apparatus of claim 4, wherein the metal comprises aluminum.

6. The apparatus of claim 1, wherein the first light is blue light and the second light is red light or green light.

7. The apparatus of claim 1, wherein the second light impinges the cavity sides.

8. The apparatus of claim 7, wherein the cavity sides are coated with a reflective material.

9. The apparatus of claim 1, wherein a cross-section of the body has a rectangular shape.

10. The apparatus of claim 1, wherein the phosphor has a curved rear surface that is in thermal contact with a curved surface of the body.

11. The apparatus of claim 1, wherein the phosphor is a yellow phosphor.

12. The apparatus of claim 1, wherein the body is a solid mass.

13. The apparatus of claim 1, wherein the cavity sides are separate pieces that are placed in contact with one another.

14. Apparatus comprising:
   illumination sources configured to emit illumination light;
   a spatial light modulator optically coupled to the illumination sources, the spatial light modulator configured to receive the illumination light from the illumination sources, and the spatial light modulator configured to modulate the illumination light to produce modulated light; and projection optics optically coupled to the spatial light modulator, the projection optics configured to receive the modulated light and to project the modulated light; and at least one of the illumination sources comprising:

a body having a cavity and an opening to the cavity, the cavity having a rear surface and cavity sides extending from the rear surface to the opening;

a phosphor on the rear surface, the phosphor having tapered phosphor side surfaces contacting the cavity sides; and a collimating lens having a concave surface facing the phosphor, the collimating lens optically coupled to the phosphor, the collimating lens configured to direct first light to the phosphor; and wherein the phosphor is configured to produce the illumination light through the opening responsive to receiving the first light.

15. The apparatus of claim 14, wherein the body comprises a thermally conductive metal material.

16. The apparatus of claim 15, wherein the thermally conductive metal material further comprises aluminum.

* * * * *